US011405284B1

(12) United States Patent
Evans et al.

(10) Patent No.: US 11,405,284 B1
(45) Date of Patent: Aug. 2, 2022

(54) GENERATING NETWORK LINK UTILIZATION TARGETS USING A PACKET-LOSS-VERSUS-LINK UTILIZATION MODEL

(71) Applicant: Amazon Technologies, Inc., Seattle, WA (US)

(72) Inventors: John William Evans, Frome (GB); Seyed Arash Sadrieh, Horsley (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/909,602

(22) Filed: Jun. 23, 2020

(51) Int. Cl.
*G06F 15/173* (2006.01)
*H04L 41/14* (2022.01)
*H04L 43/0882* (2022.01)
*H04L 43/0829* (2022.01)

(52) U.S. Cl.
CPC .......... *H04L 41/14* (2013.01); *H04L 43/0829* (2013.01); *H04L 43/0882* (2013.01)

(58) Field of Classification Search
CPC .. H04L 41/14; H04L 43/0829; H04L 43/0882
USPC .................................................. 709/224–226
See application file for complete search history.

(56) References Cited

U.S. PATENT DOCUMENTS

| 6,690,646 B1* | 2/2004 | Fichou | H04L 41/0896 370/231 |
| 7,398,438 B2* | 7/2008 | Agarwal | H04L 45/02 370/254 |
| 10,992,558 B1* | 4/2021 | Silva | H04L 43/12 |
| 2011/0205901 A1* | 8/2011 | Imai | H04L 45/38 370/238 |
| 2015/0332165 A1* | 11/2015 | Mermoud | G06N 20/00 706/12 |

* cited by examiner

*Primary Examiner* — Duyen M Doan
(74) *Attorney, Agent, or Firm* — Klarquist Sparkman, LLP (57) ABSTRACT

A method and system are described for automatically determining network utilization bounds in order to meet per-link packet loss rate targets through the network. A loss-verses-utilization model is continuously re-generated as part of a feedback loop to update link utilization targets. A target loss rate can be used to generate a link utilization target value using the model. The link utilization target value can be used in a variety of network update models, such as traffic engineering, capacity planning and risk management. Updates can be applied to individual network links, network devices as a whole, or groups of devices (based on type or position in the network).

20 Claims, 7 Drawing Sheets

GENERATING NETWORK LINK UTILIZATION TARGETS USING A PACKET-LOSS-VERSUS-LINK UTILIZATION MODEL

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies, such as equal-cost multi-path (ECMP) routing, which is a strategy where next-hop packet forwarding to a destination can occur over multiple best paths.

Latency is an important metric for testing of a network. Network operations and engineering teams use latency determinations to identify and fix network performance problems. The latency experienced between a network source and a network destination is determined by the sum of link propagation latencies for the links on the network path between them, and the sum of the switching and queuing latencies at each router hop that interconnects those links. Another important metric is packet loss. When a network interface becomes overloaded and a memory buffer has reached its limit, packets can be dropped.

In order to manage the latency and packet loss, a network link utilization should be properly managed. The network link utilization relates to a number of bits transmitted over a network link in a given time period divided by a maximum capacity of that network link. Because modern networks include a large number of links, a weighted average of the link utilization for all the links can be used to represent network utilization as a whole. However, there are inefficiencies in the current management of the network link utilization.

DETAILED DESCRIPTION

A consideration in network and capacity planning is to determine a maximum link utilization target needed to meet latency and packet loss rate requirements. The resulting targets can vary in different parts of the network depending on the traffic profile, the network devices used, the device buffering and configuration. If the link utilization target is set too high, inadvertent packet loss can occur. If the utilization target is set too low, network capacity is wasted. A method and system are described for automatically determining network link utilization bounds in order to meet per-link packet loss rate targets through the network. A loss-verses-utilization model is continuously re-generated as part of a feedback loop to update link utilization targets. The link utilization target value can be used in a variety of network update models, such as traffic engineering, capacity planning and risk management. Updates can be applied to individual network links, network devices as a whole, or groups of network devices (e.g., based on type or position in the network).

Figure 1:
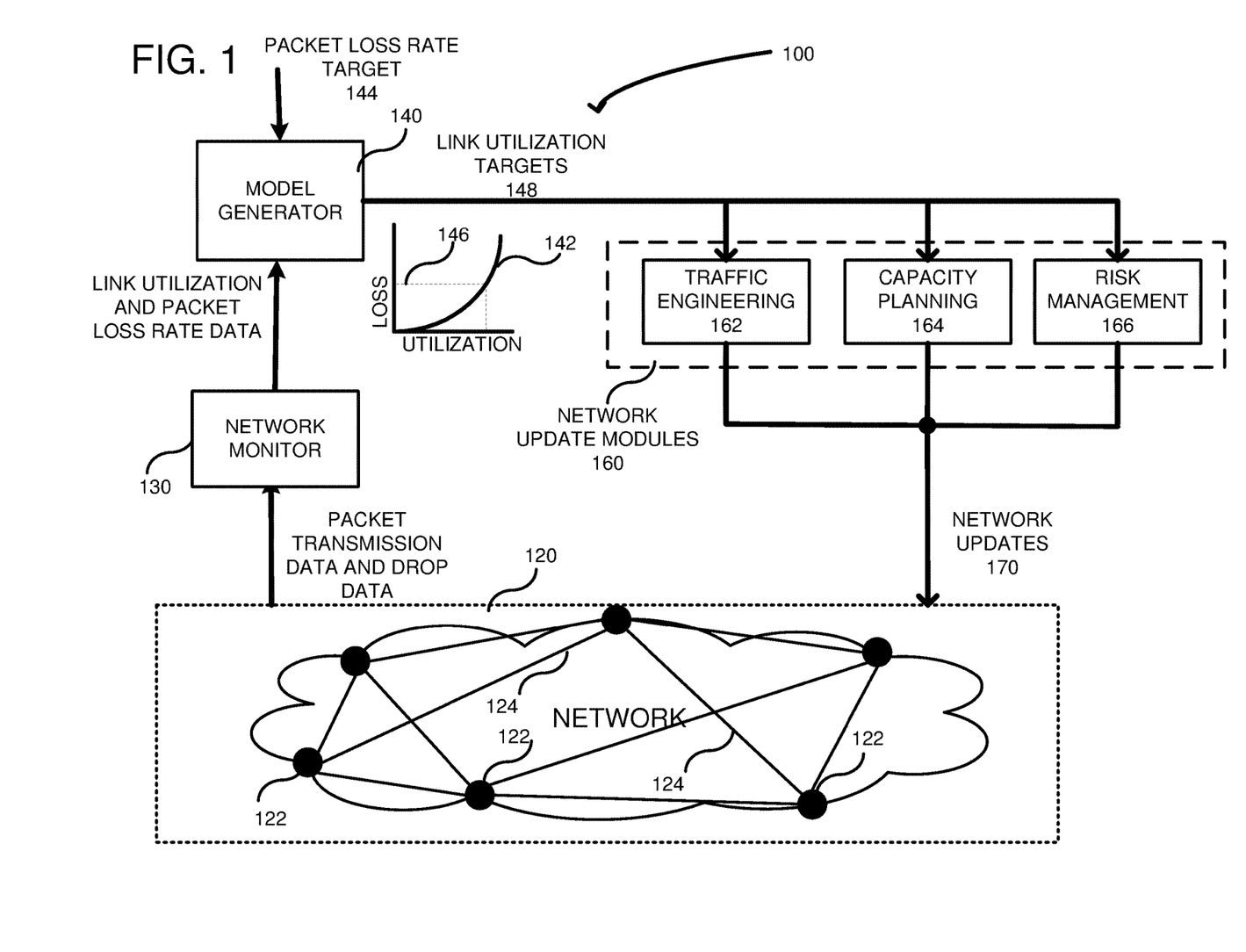
FIG. 1 is a system diagram for continuously generating a model of link-utilization versus packet loss rate and for generating a link-utilization target used to modify a network.

FIG. 1 shows a system 100 for continuously generating a model 110 used for calculating link utilization targets, which, in turn, can be used to update a network 120. The network 120 includes network devices (nodes), shown generally at 122, and links (i.e., paths), shown generally at 124, between the network devices. Although represented as a few network devices and links, the network 120 generally includes hundreds of thousands of such devices and links. The network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data through the network 120. The links 124 can be any optical or electrical cables for interconnecting the network devices, such as Ethernet cables, as well as radio-based connections. The network devices can be configured and updated, wherein the configurations include software versions (applications and operating system versions), variables, policies, protocols used, protocol parameters, frequency, speed, interface settings, etc. As explained further below, the network devices further include forwarding tables that control how packets are routed through the network.

A network monitor 130 can receive packet data including packet transmission data and packet drop data from the network devices. The packet transmission data can include a number of packets transmitted through the network device and the packet drop data can include a number of packets dropped. A time can be associated with the packet data. Additionally, the packet data can be on a per-port basis or a per-interface basis, wherein multiple ports are generally connected to each interface. The network monitor 130 can compute link utilization and packet loss rate data from the packet data. The link utilization data can be associated with the packet transmission data over a time period. In a specific example, the link utilization can be bits or bytes transmitted divided by the capacity of a link for a time period. The link utilization can be a relative number, such as a percentage, or an absolute number (e.g., 50 Gigabytes/sec). The network monitor can use the received packet transmission data for a current time T1, subtract the packet transmission data for a previous time, T2, and divide the difference by the time period between T1 and T2. The result is how many packets were transmitted in the time interval between T2 and T1. This number can then be divided by the capacity of the link to determine the link utilization. A similar calculation can be performed for dropped packets to calculate the loss rate data.

For example, the packet loss rate can be the number of packets dropped between time periods T2 and T1, divided by the sum of the number of packets dropped and the number of packets transmitted. Like the link utilization, the packet loss rate can be a relative number, such as a percentage, or an absolute number such as 50 packets/second. The network monitor 130 can transmit the calculated link utilization and packet loss rate data to a model generator 140.

The model generator 140 generates a model, which is a function, periodically (at fixed, predetermined time intervals) or as a result of an event (e.g., changes to the network or changes to network traffic) using the link utilization and packet loss rate data received from the network monitor 130. The function is shown as a function 142, which can be generated relating packet loss rate to the link utilization. The function 142 can be visualized as a simple graph of the packet loss rate data verses the link utilization data for a plurality of points in time. In the illustrated example, the packet loss rate data is projected on the y axis and the link utilization data is projected along the x axis. The axes can be swapped. Additionally, weighting can be applied to either axis or both axes. A plurality of data points of packet loss rate verses link utilization can be used to generate the function 142 using regression (linear or non-linear) or other curve-fitting methods. The model generator 140 can also receive a packet loss rate target 144, which is a desired packet loss rate for the network 120 (e.g., a maximum packet loss rate). The packet loss rate target 144 can be provided by a network administrator or extracted from a network policy. The packet loss rate target 144 can be applied to the function in order to determine a corresponding utilization. For example, a specified target loss rate is shown at 146, and can be mapped to the function 142 to determine a corresponding utilization point of the network links that is expected to meet the specified link loss rate target, as indicated by the dashed lines. Using this mapping, the resultant utilization point can be output as a link utilization target 148. Thus, packet loss rate data can be related to link utilization to obtain a function 142, and a target packet loss rate number 144 can be used to determine a corresponding target link utilization number 148.

The link utilization targets 148, like the model generator 140, can be re-calculated or generated continuously based on when the model is generated or when the link loss target 144 is modified. The link utilization targets 148 can be associated with individual ports on network devices, network devices as a whole, or groups of network devices. The groups of network devices can be a tier of network devices (for network architectures that are organized into tiers) or based on a type of network device. The link utilization targets 148 can be input into one or more network update modules 160. Example update modules 160 include a traffic engineering module 162, a capacity planning module 164 and a risk management module 166. Other modules can also be used. The modules 160 generally provide network updates 170 to the network 120, including the network devices 122. The traffic engineering module 162 can provide updates to the network devices 122, as part of the updates 170, such as changes to forwarding tables in the network devices to modify traffic routing through the network. For example, the forwarding tables in the network devices 122 can direct traffic to less congested network areas to ensure that the packet loss rate target is met. The traffic engineering 162 can also change configurations on the network devices 122 in response to the link utilization targets 148. The capacity planning module 164 can use the link utilization targets 148 to make determinations regarding future purchases of network devices. Thus, if the capacity planning module 164 determines that link utilization is above a threshold value, it can determine how many network devices 122 to add to the network. The risk management module 166 can assess the risk associated with removing or updating the network devices 122. The link utilization target 148 can be used by the risk management module 166 because if the link utilization target 148 is above a threshold value, then the risk increases of causing a network disruption when removing a network device.

Figure 2:
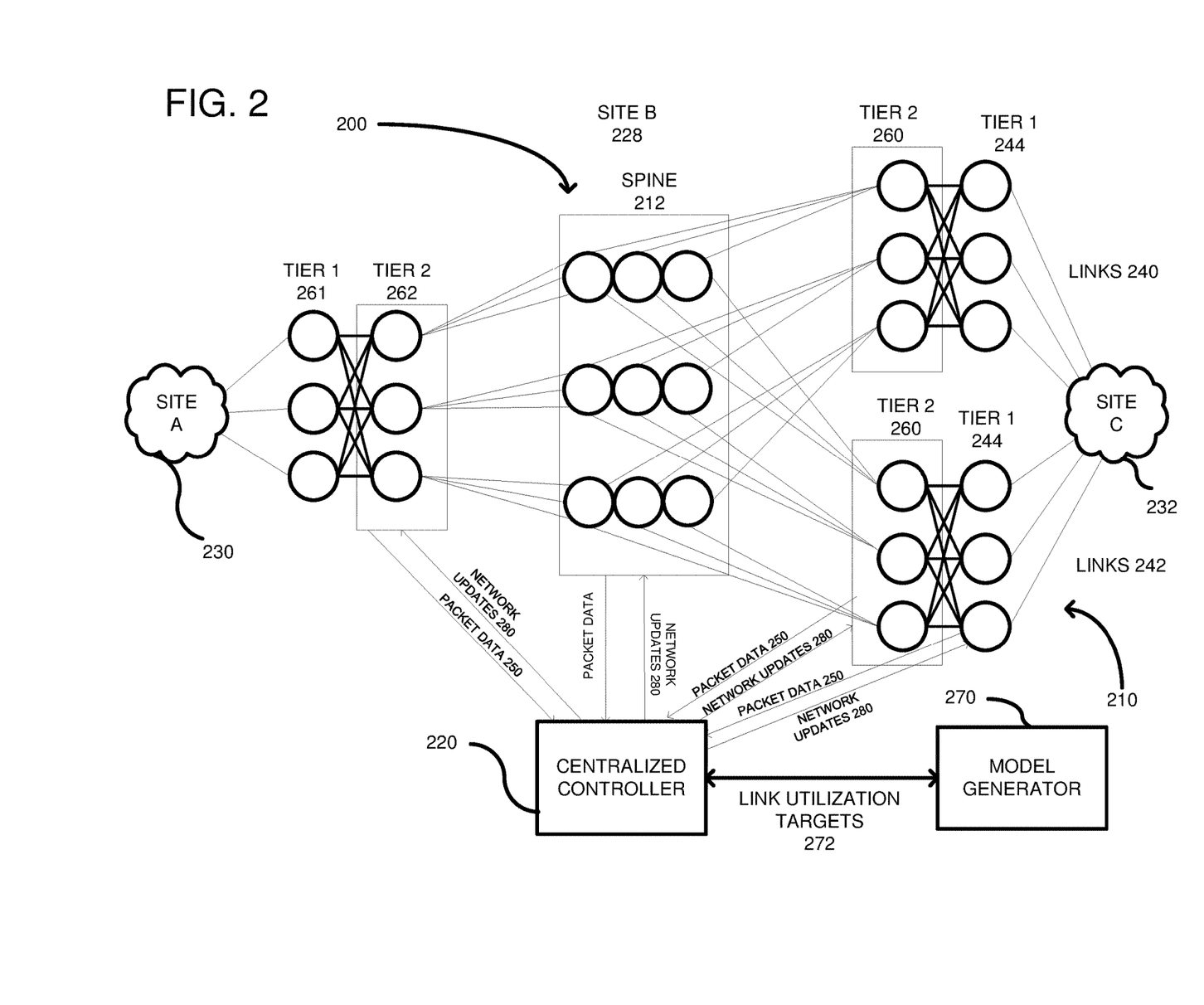
FIG. 2 is a diagram of a system according to another embodiment, wherein a centralized controller receives packet data and provides network updates.

FIG. 2 is an example hierarchical network 200 having multiple layers including tiers 210 and a spine layer 212. A variety of network structures can be used, such as a spine-leaf network topology or network structures having an intermediate aggregation layer. Other network topologies include Clos-type networks (two-tier Clos, three-tier Clos, etc.) In this embodiment, a centralized controller 220 executes on a server computer and is a distribution mechanism for collecting packet data and for distributing network updates through the tiers 210 and spine layers 212. It should be recognized that the centralized controller described in all embodiments herein can be a distributed computing environment having multiple server computers. In this embodiment, the hierarchical network 200 is shown as a site B 228 coupled to other networks labeled Site A at 230 and Site C at 232. A lowest tier of the network, tier 1 244 is shown having 6 switches coupled to Site C using links 240 and links 242. Packet data 250 of tier 1 244 is passed back to the centralized controller 220, as shown at 250. Although only a single arrow 250 is shown, it is understood that all switches in the tier 1 244 are sending packet data to the centralized controller 220. The packet data 250 can include packet transmission data and packet drop data. Packet data can also be received for the other tiers 260, 261 and 262 as indicated by the arrows from each tier. Receiving individual packet data for the links allows the centralized controller 220 to obtain a more global view of network traffic across the links.

A model generator 270 can be coupled to the centralized controller 220 and generate a model of packet loss rate versus link utilization. Specifically, the centralized controller 220 can pass link utilization data and packet loss rate data to the model generator. Based upon this model, the model generator 270 can generate a link utilization target 272, which can be passed back to the centralized controller 220. The centralized controller 220 can then make network updates, shown at 280, which can be applied to the network devices. The updates 250 can be applied to groups of network devices (e.g., tier 260) or to individual devices within the tiers or spine. Still further, updates 250 can be based on individual ports within the network devices. Thus, the link utilization targets 272 can be on a per-port basis.

Figure 3:
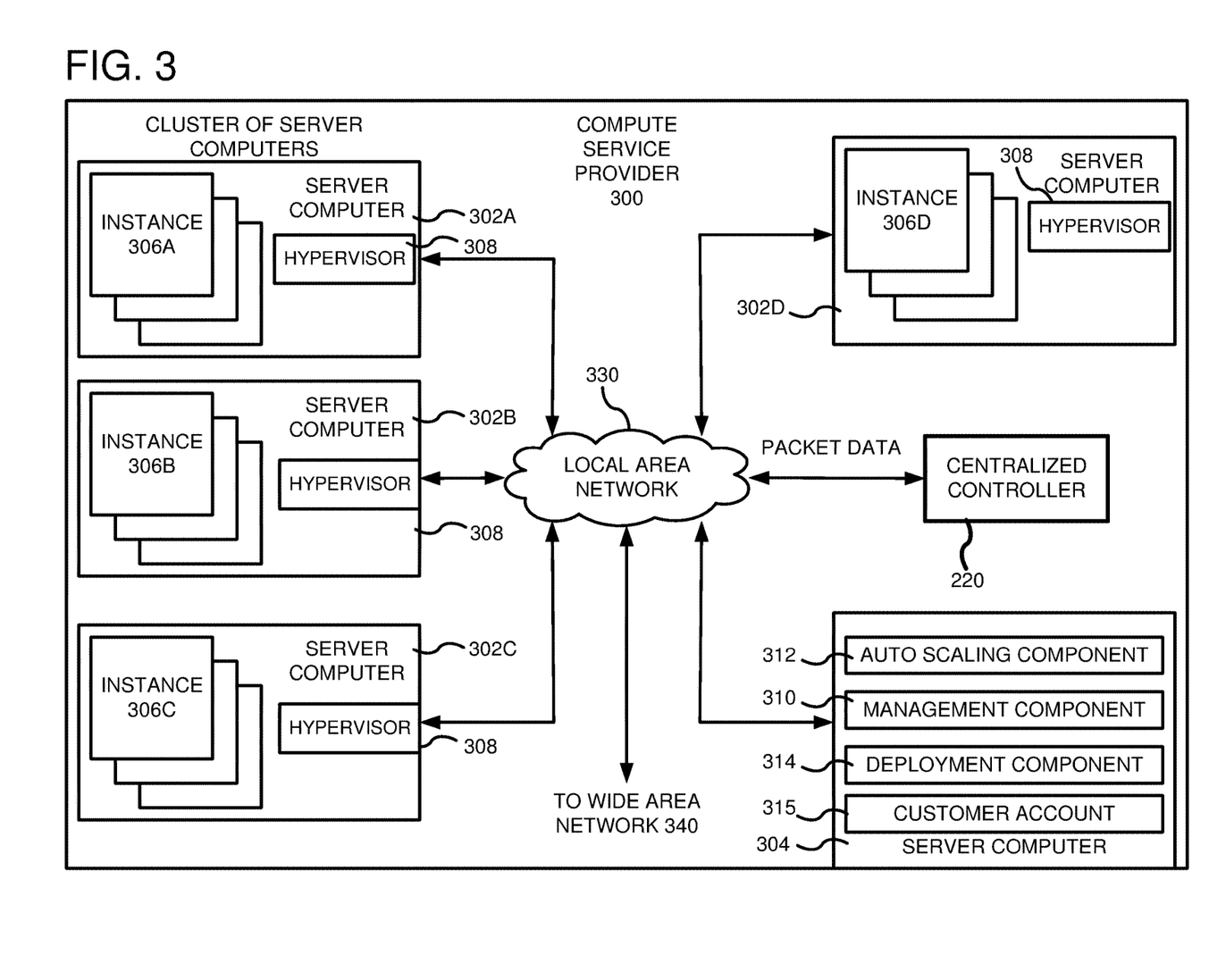
FIG. 3 is an example system diagram showing a plurality of virtual machine instances running in the multi-tenant environment, wherein the centralized controller operates in the multi-tenant environment.

FIG. 3 is a computing system diagram of a network-based compute service provider 300 that illustrates one environment in which embodiments described herein can be used. By way of background, the compute service provider 300 (i.e., the cloud provider) is capable of delivery of computing and storage capacity as a service to a community of end recipients. In an example embodiment, the compute service provider can be established for an organization by or on behalf of the organization. That is, the compute service provider 300 may offer a "private cloud environment." In another embodiment, the compute service provider 300 supports a multi-tenant environment, wherein a plurality of customers operate independently (i.e., a public cloud environment). Generally speaking, the compute service provider 300 can provide the following models: Infrastructure as a Service ("IaaS"), Platform as a Service ("PaaS"), and/or Software as a Service ("SaaS"). Other models can be provided. For the IaaS model, the compute service provider 300 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 300 using networked client devices, such as desktop computers, laptops, tablets, smartphones, etc. running web browsers or other lightweight client applications. Those skilled in the art will recognize that the compute service provider 300 can be described as a "cloud" environment.

In some implementations of the disclosed technology, the computer service provider 300 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 300 includes a plurality of server computers 302A-302D. While only four server computers are shown, any number can be used, and large centers can include thousands of server computers. The server computers 302A-302D can provide computing resources for executing software instances 306A-306D. In one embodiment, the instances 306A-306D are virtual machines. As known in the art, a virtual machine is an instance of a software implementation of a machine (i.e. a computer) that executes applications like a physical machine. In the example of virtual machine, each of the servers 302A-302D can be configured to execute a hypervisor 308 or another type of program configured to enable the execution of multiple instances 306 on a single server.

Additionally, each of the instances 306 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 304 can be reserved for executing software components for managing the operation of the server computers 302 and the instances 306. For example, the server computer 304 can execute a management component 310. A customer can access the management component 310 to configure various aspects of the operation of the instances 306 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 312 can scale the instances 306 based upon rules defined by the customer. In one embodiment, the auto scaling component 312 allows a customer to specify scale-up rules for use in determining when new instances should be instantiated and scale-down rules for use in determining when existing instances should be terminated. The auto scaling component 312 can consist of a number of subcomponents executing on different server computers 302 or other computing devices. The auto scaling component 312 can monitor available computing resources over an internal management network and modify resources available based on need.

A deployment component 314 can be used to assist customers in the deployment of new instances 306 of computing resources. The deployment component can have access to account information associated with the instances, such as who is the owner of the account, credit card information, country of the owner, etc. The deployment component 314 can receive a configuration from a customer that includes data describing how new instances 306 should be configured. For example, the configuration can specify one or more applications to be installed in new instances 306, provide scripts and/or other types of code to be executed for configuring new instances 306, provide cache logic specifying how an application cache should be prepared, and other types of information. The deployment component 314 can utilize the customer-provided configuration and cache logic to configure, prime, and launch new instances 306. The configuration, cache logic, and other information may be specified by a customer using the management component 310 or by providing this information directly to the deployment component 314. The instance manager can be considered part of the deployment component.

Customer account information 315 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

The centralized controller 220 can be a service within the compute service provider 300 environment, and can receive the packet data, such as link utilization and packet loss rate data, and generate the link utilization targets, as described above.

A network 330 can be utilized to interconnect the server computers 302A-302D and the server computer 304. The network 330 can be a local area network (LAN) and can be connected to a Wide Area Network (WAN) 340 so that end users can access the compute service provider 300. It should be appreciated that the network topology illustrated in FIG. 3 has been simplified and that many more networks and networking devices can be utilized to interconnect the various computing systems disclosed herein.

Figure 4:
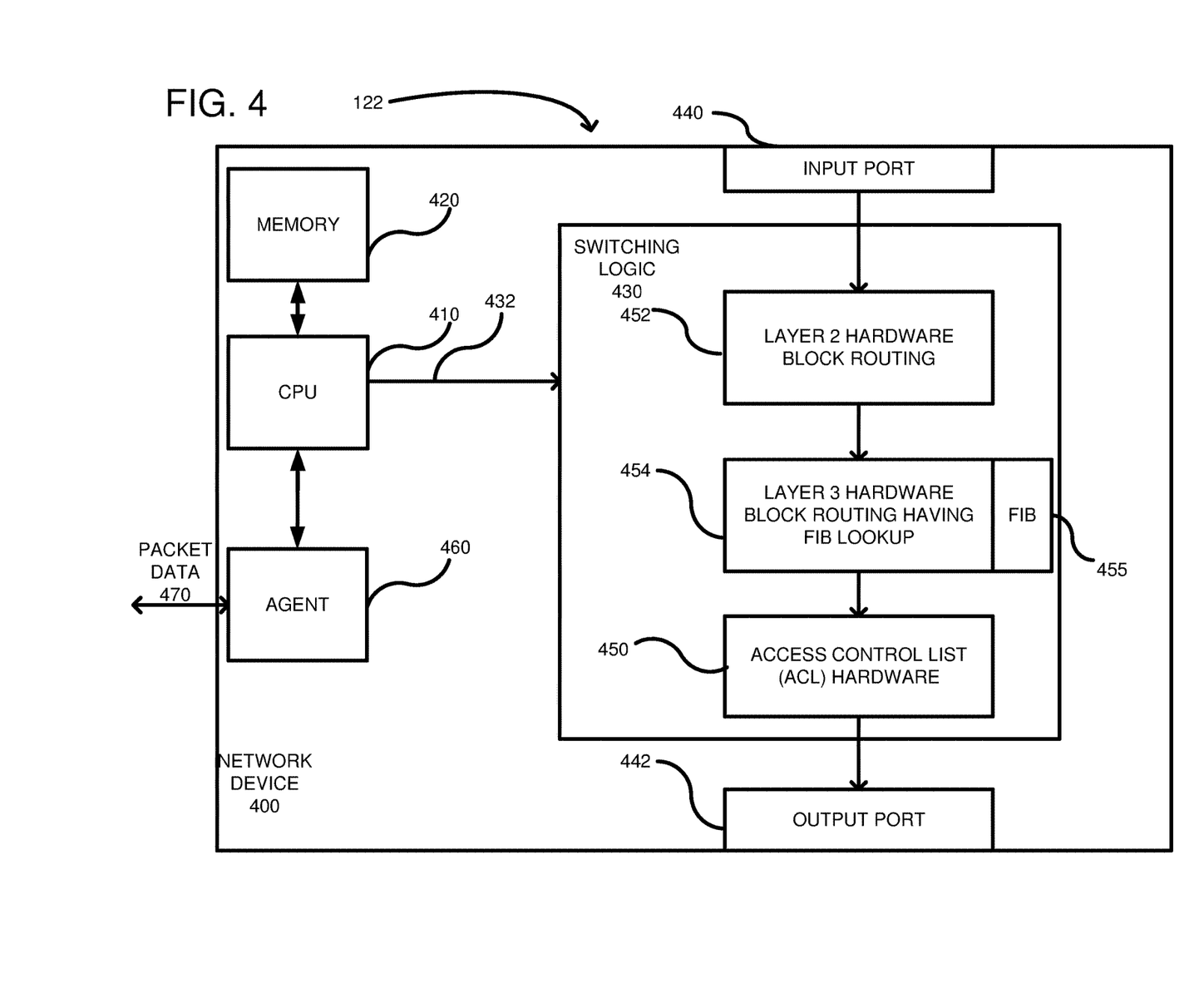
FIG. 4 is an example of a network device including an agent for supplying packet data.

FIG. 4 shows a detailed example of an embodiment of the network device 122. Network device 122 is a switch that routes packets to a next hop in the network using a destination IP address. The network device 122 is an example of any of the network devices shown in FIGS. 1 and 2. A CPU 410 is coupled to a memory 420 and to switching logic 430 through a bus 432 (PCIe or other protocols and bus types can be used). The switching logic 430 is positioned between an input port 440 and an output port 442, which are typically adapted to receive network cables, such as Ethernet cables. Although only one input port 440 and one output port 442 are shown, typically there are multiple ports (also called interfaces) on a network device. The switching logic 430 can be a single ASIC integrated circuit or divided into multiple integrated circuits. The switching logic 430 can include multiple different hardware logic blocks including a layer 2 hardware block 452, a layer 3 hardware block 454, and an Access Control List (ACL) hardware block 450. The layer 2 hardware block 452 relates to an Ethernet layer and can forward packets based on MAC tables. The layer 2 lookup ensures that an incoming packet's MAC address equals the MAC address of the network device 122. If so, then the packet can proceed onto the layer 3 hardware. If not, then the layer 3 lookup does not occur. The layer 3 hardware block 454 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 455, which includes destination addresses (e.g., prefixes) for packets being transmitted through the switching logic and associated ports for forwarding the packets. The network device 122 can run routing protocols, such as an Open Shortest Path First (OSPF) or a Routing Information Protocol (RIP), to communicate with other Layer 3 switches or routers. The routing tables are used to lookup the route for an incoming packet. The ACL block 450 relates to permissions and can include rules whether to drop packets. The different hardware blocks can be coupled in series and additional hardware blocks can be added based on the design. Packets pass from the input port 440 to the output port in accordance with the configuration of the hardware logic blocks 450, 452, 454. The input port 440, output port 442 and switching logic 430 can be considered a data plane or forwarding plane of the network device 122. By contrast, the CPU 410, memory 420, and an agent 460 are considered part of a control plane.

As shown, the agent 460 can execute on the CPU 410 and can be used to transmit packet data to the centralized controller 220 (FIG. 2), as indicated at 470. The packet data can include packet transmission data and packet drop data. The switching logic 430 can compute the packet drop data and pass the packet drop data to the agent 460 over the bus 432. Likewise, the switching logic 430 calculate link utilization data and transmit it to the agent 460. Such data is available to the switching logic for each port 440, 442. The agent 460 can determine a timestamp to store with the packet drop data and transmit the packet drop data together with the timestamp to the centralized controller 220. The agent 460 can also send packet transmission data and a time stamp. In one example, the switching logic 430 can determine the packet transmission data by having a free running counter to count each packet. However, the counter may not track the packets over a predetermined period. Instead, the network monitor 130 can perform the computation by receiving the current count and the time stamp and subtracting a last-received count and its time stamp. A difference can be taken to compute the link utilization and the packet loss rate data. The agent 460 can also receive network updates, which can be applied to the switching logic 430, such as the FIB 455.

Figure 5:
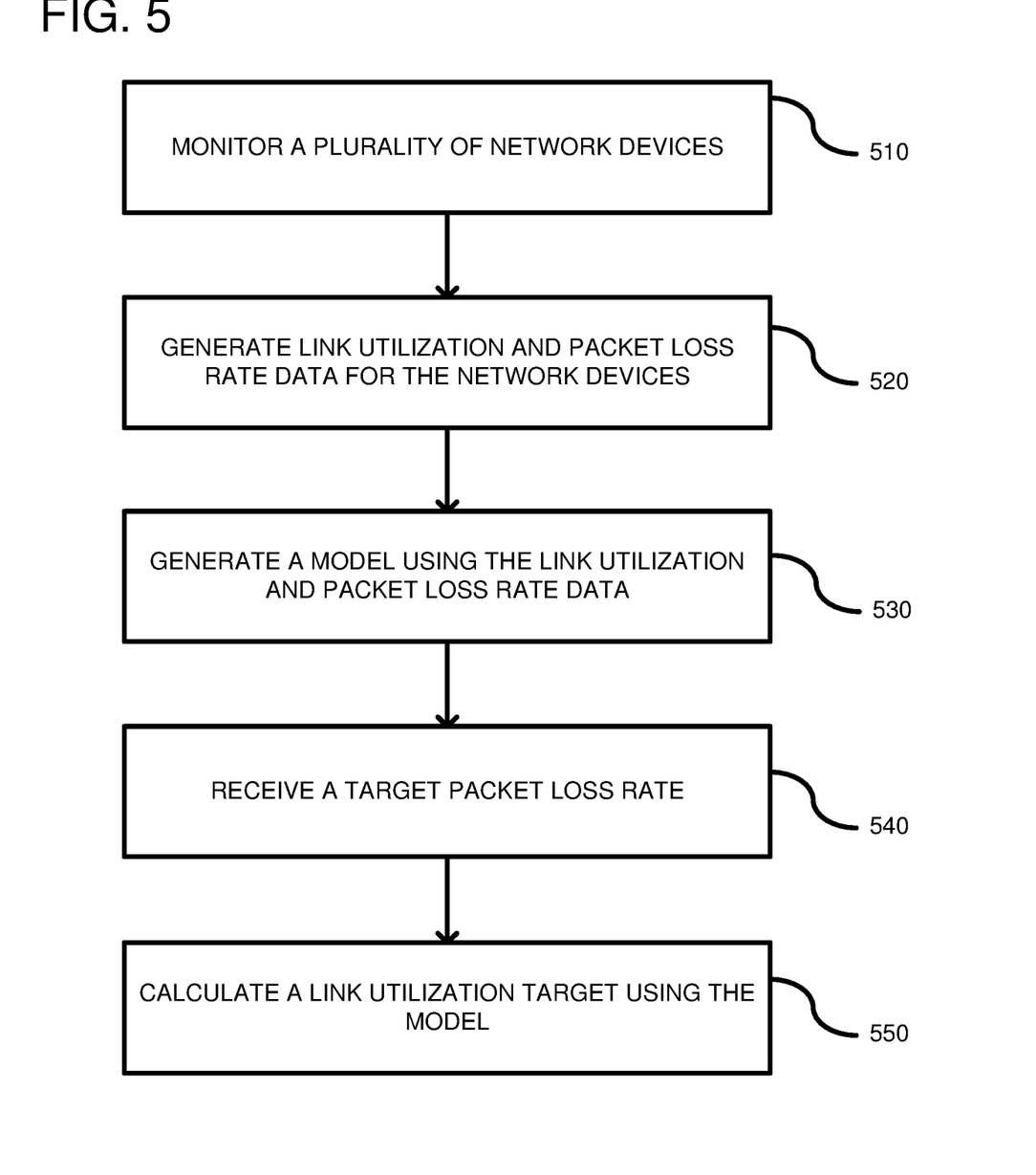
FIG. 5 is a flowchart according to one embodiment for generating a model used for calculating a link utilization target.

FIG. 5 is a flowchart according to one embodiment for determining a link utilization target. In process block 510, a plurality of network devices are monitored. For example, in FIG. 1, the network devices 122 can be monitored by the network monitor 130. The network monitor 130 can receive raw data (packet data) that needs to be converted to link utilization data, which is a number of bits transmitted over capacity of the link for a time period, and packet loss rate data, which is a number of packets dropped over total packets (dropped plus transmitted) for a time period. Thus, in process block 520, link utilization and packet loss rate data is generated for the network devices by the network monitor. In an alternative embodiment, the network devices can supply the link utilization and packet loss rate data to the network monitor 130 so that no calculation needs to be performed by the network monitor. In such a case, the generating of the link utilization and the packet loss rate data is performed by the network devices. In process block 530, a model is generated using the link utilization and packet loss rate data. For example, the model generator 140 can determine a function 142 using packet loss rate versus utilization. Each network device (or network device interface) can be a data point and regression can be used to generate the function 142. In process block 540, a target packet loss rate is received. For example, in FIG. 1, the packet loss rate target 144 can be received and represents a desired limit on lost packets. In process block 550, a link utilization target can be calculated using the target packet loss rate. For example, in FIG. 1, the packet loss rate target 144, which can be a target packet loss rate, is used with the function 142 in order to calculate a link utilization target 148.

Figure 6:
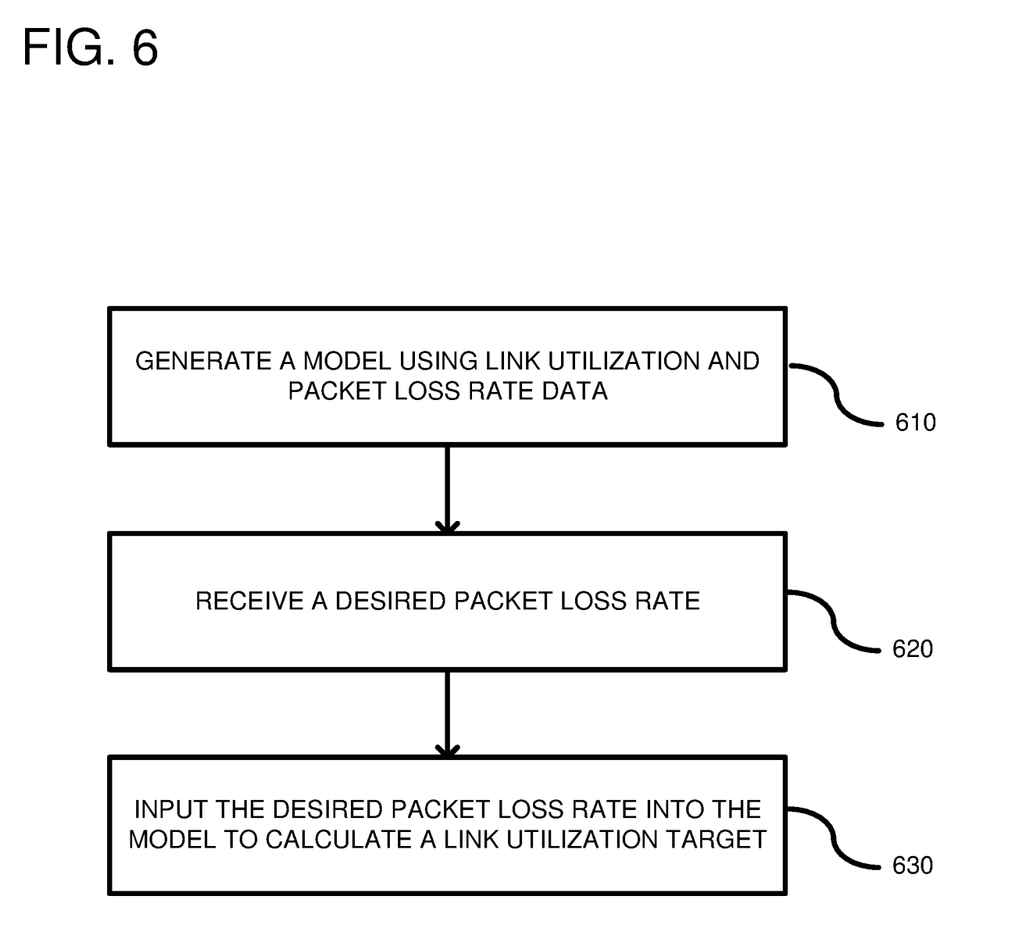
FIG. 6 is a flowchart according to another embodiment for generating a model used for calculating a link utilization target.

FIG. 6 is a flowchart according to one embodiment for calculating a link utilization target. In process block 610, a model can be generated using link utilization and packet loss rate data. For example, in FIG. 1, the model generator 140 can generate a model, which is represented as function 142 and is a plot of packet loss rate verses utilization. In process block 620, a desired packet loss rate is received. For example, the model generator 140 can receive a desired packet loss rate, such as the packet loss rate target 144. In process block 630, the desired packet loss rate can be input into the model to calculate the link utilization target. As previously described, the link utilization target can then be used as a feedback loop to update the network devices, such as by updating the FIB in the network devices.

Figure 7:
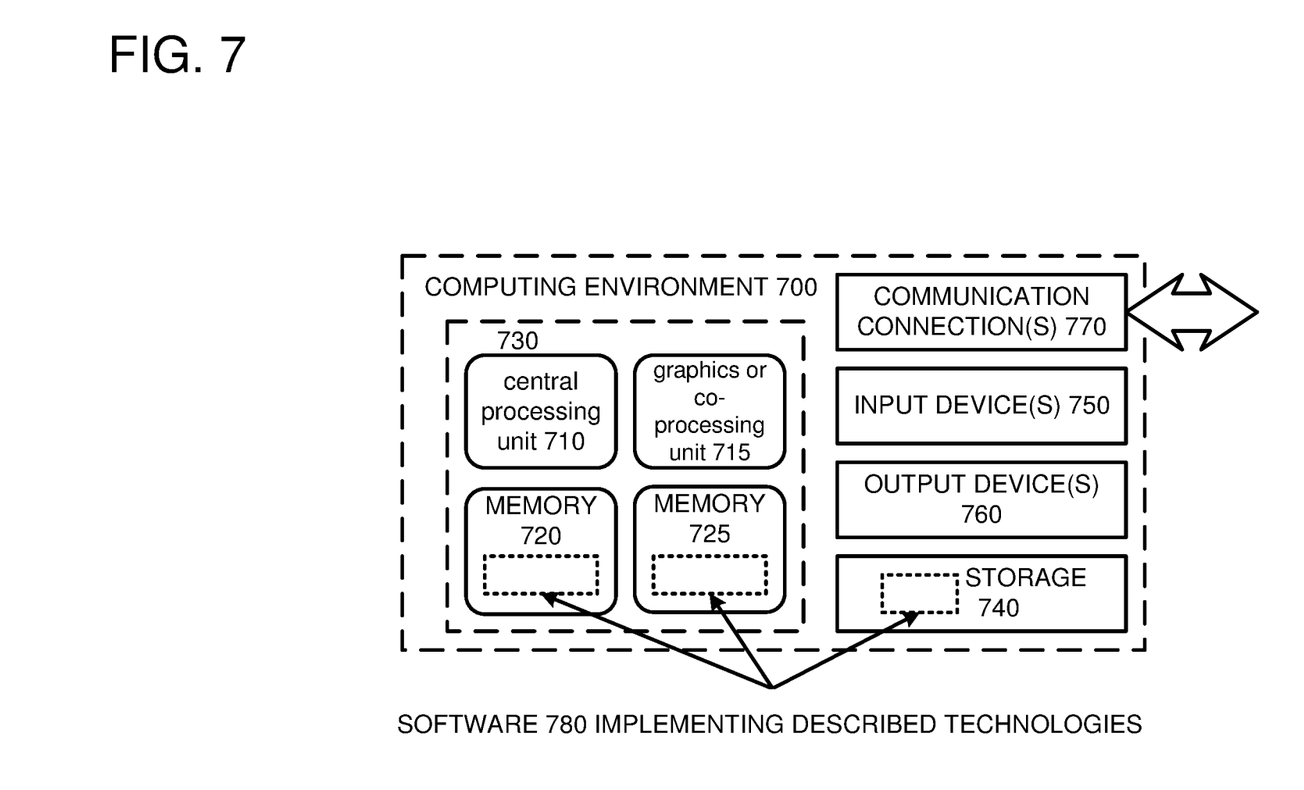
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, the computing environment 700 can be used as the model generator 140.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of determining a link utilization target for a computer network, the method comprising:
   monitoring a plurality of network devices in the computer network;
   generating link utilization and packet loss rate data for the plurality of network devices;
   generating a model using the received link utilization and the packet loss rate data, wherein the model includes a function of packet loss rate verses link utilization;
   receiving a target packet loss rate; and
   calculating the link utilization target using the target packet loss rate and the function of the packet loss rate verses link utilization.

2. The method of claim 1, wherein the monitoring includes receiving information from the network devices including packet transmission data over a time period and dropped packets over a time period.

3. The method of claim 1, further including modifying the network devices to comply with the link utilization target.

4. The method of claim 3, wherein the modifying includes updating forwarding tables in the network devices.

5. The method of claim 1, wherein the model is re-generated at predetermined time intervals and the link utilization target is re-calculated each time the model is re-generated.

6. A method, comprising:
   generating a model using link utilization and packet loss rate data based on packet information received from network devices in a network, wherein the model represents packet loss rate as a function of link utilization;
   receiving a desired packet loss rate for the network; and
   inputting the desired packet loss rate into the model to calculate a link utilization target.

7. The method of claim 6, wherein the generating the model includes using regression.

8. The method of claim 6, further including collecting the packet information from the network devices, wherein the packet information includes numbers of dropped packets and packets transmitted over a time period.

9. The method of claim 6, wherein the model is re-generated at fixed periodic intervals and transmitted to a centralized controller that updates the network devices to meet the link utilization target.

10. The method of claim 9, wherein the link utilization target is calculated individually for each network device in the network based on the packet information from each network device.

11. The method of claim 9, wherein the link utilization target is calculated for a group of network devices in the network.

12. The method of claim 6, further including using the link utilization target to determine how much capacity to add to the network to maintain the network within the link utilization target.

13. The method of claim 6, further including determining whether modifying the network will result in the link utilization target being exceeded.

14. The method of claim 6, wherein link utilization and packet loss rate data is calculated by a network monitor that collects the packet information from network devices in the network.

15. A system, comprising:
network devices configured to transmit packet information; and
a model generator, executing on a server computer, coupled to the network devices, the model generator configured to receive the packet information from the network devices and generate a model relating packet loss rate as a function of link utilization in the network;
wherein the model generator is configured to receive a packet loss rate target value and to generate a link utilization target from the packet loss rate target value using the model.

16. The system of claim 15, further including a network monitor coupled to the network devices for receiving packet transmit data and packet drop data and for converting the packet transmit data and packet drop data to link utilization and packet loss rate data.

17. The system of claim 15, further including a traffic engineering module configured to receive the link utilization target and to modify the network devices in response.

18. The system of claim 17, wherein the modification of the network devices includes updating respective forwarding tables in the network devices.

19. The system of claim 15, wherein the network devices are routers or switches.

20. One or more non-transitory computer-readable media comprising computer-executable instructions that, when executed, cause a computing system to perform a method, comprising,
generating a model using link utilization and packet loss rate data based on packet information received from network devices in a network, wherein the model represents packet loss rate as a function of link utilization;
receiving a desired packet loss rate for the network; and
inputting the desired packet loss rate into the model to calculate a link utilization target.

* * * * *